United States Patent [19]

Polischuk-Sawtschenko

[11] 3,906,153

[45] Sept. 16, 1975

[54] REMOTE SYNCHRONOUS LOOP OPERATION OVER HALF-DUPLEX COMMUNICATIONS LINK

[75] Inventor: Alexander Polischuk-Sawtschenko, Raleigh, N.C.

[73] Assignee: International Business Machines Corporation, Armonk, N.Y.

[22] Filed: Dec. 26, 1973

[21] Appl. No.: 428,606

[52] U.S. Cl. ......... 178/58 A; 179/15 AL; 179/15 BS

[51] Int. Cl.² ............................................ H04J 3/06

[58] Field of Search ...... 178/58 A; 179/15 AL, 1 C, 179/2 C, 15 BS

[56] References Cited

UNITED STATES PATENTS 3,544,976 12/1970 Collins ........................... 179/15 AL

FOREIGN PATENTS OR APPLICATIONS 1,762,425 5/1970 Germany .......................... 178/58 A

*Primary Examiner*—David L. Stewart

*Attorney, Agent, or Firm*—John B. Frisone

[57] ABSTRACT

A remote synchronous loop which operates in the manner disclosed in U.S. Pat. No. 3,752,932 is connected to a central control unit by a local interface unit and a half-duplex communications link. The local interface unit provides an interface between the half-duplex link and the loop and has four modes of operation. These modes are stand by, receive, turn-around and transmit. During stand-by mode, the devices on the loop are neither receiving or transmitting data and the local interface unit provides clocking and synchronization signals for the devices on the loop. During receive mode, the local interface unit provides for gradual synchronization of the loop devices to the received data clock without loss of data. During turn-around mode which occurs between receive and transmit, the local interface unit maintains synchronization of the remote loop devices and enables transmission when the half-duplex link is clear. During transmit mode, the interface unit enables the remote loop devices and passes the received data from the loop to the half-duplex link. This mode is entered from the turn-around mode after the half-duplex link is clear.

7 Claims, 3 Drawing Figures

REMOTE SYNCHRONOUS LOOP OPERATION OVER HALF-DUPLEX COMMUNICATIONS LINK

BACKGROUND OF THE INVENTION

1. Field of the Invention

The invention relates to data communications systems in general and more particularly to a remote loop system in which a half-duplex data communications link is utilized to connect a synchronously operated remote loop to a central controller.

2. Description of the Prior Art

Synchronous loops are well known in the prior art and many examples may be found. The remote location of entire loops or portions thereof is no problem in those instances where full duplex communications paths may be used. However, a communications loop, at least when operated in a synchronous manner, is full duplex in nature and requires a full duplex connection for normal operation. In many instances, full duplex connection is either not readily available or too costly and half-duplex connection must be utilized. Arrangements of this nature have not been found in the prior art.

SUMMARY OF THE INVENTION

The invention contemplates an interface unit for interconnecting a synchronous data communication loop to a central control unit by a half-duplex communication link and comprises a first circuit means for generating first clocking signals at a predetermined frequency, a second circuit means for generating second clocking signals at said predetermined frequency in synchronism with the signals received from said half-duplex communications link, clock control means responsive to the signals received from said half-duplex communications link and said second clocking signals for simultaneously incrementally adjusting the phase of the first and second clock signal generating means to cause said first and second clocking signals to gradually assume a predetermined phase relationship with respect to the phase of the signals received from said half-duplex communications link, a first buffer means for receiving data signals from said half-duplex communications link under control of said second clocking signals, a second buffer means for receiving data signals from said first buffer means under control of said first clocking signals, signal generating means for generating control signals under control of said first clocking signals, and control circuit means responsive to signals received from said half-duplex communications link for transmitting the contents of said second buffer means to the loop when data signals are being received from said half-duplex communications link and for transmitting said control signals from said signal generating means when data signals are not being received.

DESCRIPTION OF THE PREFERRED EMBODIMENT

Figure 1:
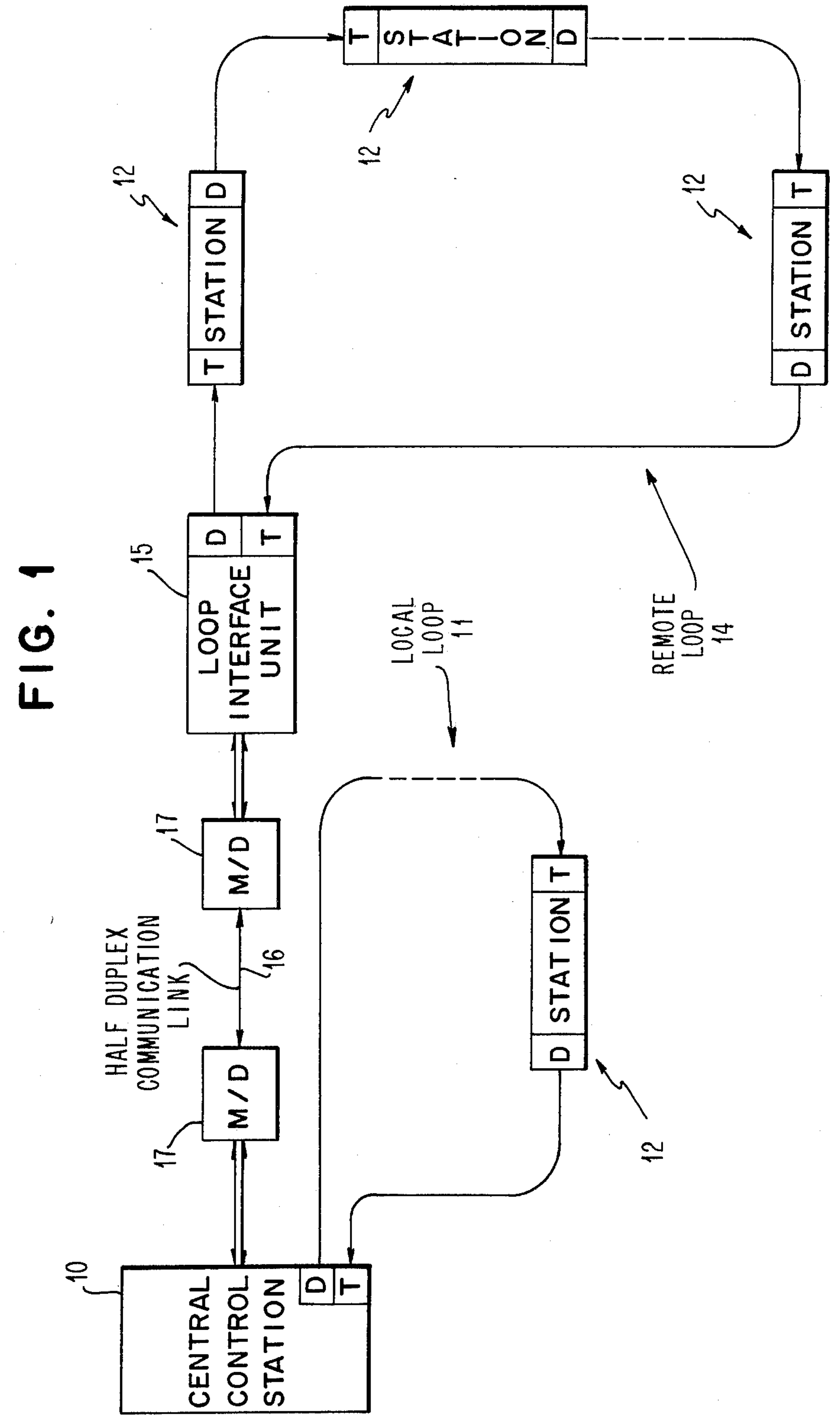
FIG. 1 is a block diagram of a complete communications system including a novel interface unit constructed in accordance with the invention.

In FIG. 1, an entire communication system is illustrated. The system chosen for illustration includes a central control station 10 which is connected to a local loop 11 by a drive D and a terminator T. The local loop 11 includes a plurality of serial connected stations 12, only one of which is shown. The operation of local loop 11 is quite conventional in all respects and may be as shown in U.S. Pat. No. 3,752,932.

Central control station 10 is also connected to a remote loop 14 which includes a number of stations 12 which are identical to the station 12 connected to the local loop 11. The remote loop 14 is connected to the driver D and terminator T of a loop interface unit 15, the operation of which will become apparent with the description of FIGS. 2 and 3. A half-duplex communication link 16 which includes a modem or data set 17 at either end provides the sole means of communication between the central control station 10 and the loop interface unit 15. This link is conventional in all respects. It can convey data signals in both directions but only in one direction at any given instant of time. Since the half-duplex communication link 16 will only operate in one direction at any given instant in time, the loop interface unit must assume the responsibility of maintaining synchronism in the remote loop and synchronizing data received from the central control unit to the remote loop. How this is accomplished will be described below.

Figure 2:
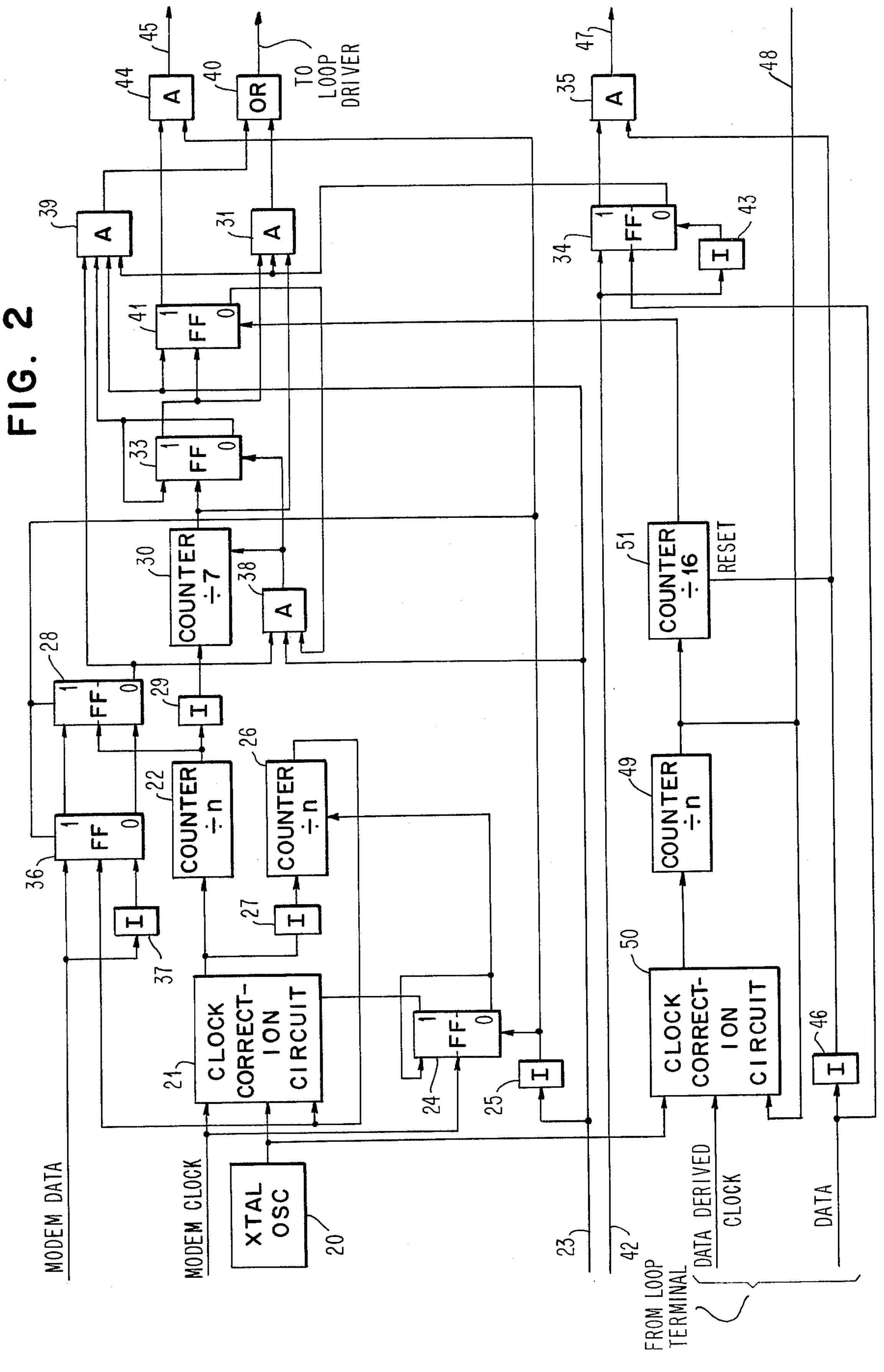
FIG. 2 is a detailed block diagram of the interface circuit illustrated in FIG. 1.

FIG. 2 illustrates in detail the components comprising loop interface unit 15. It does not include the loop driver circuit D and terminator circuit T which are conventional in all respects and may be selected from a wide variety well known in the prior art. The modems 17, illustrated in FIG. 1, are also conventional and may be selected from a wide variety available from the common carriers or other manufacturers. These modems provide a number of signals in addition to the data signals. These include modem receive clock, carrier detect and clear to send. The loop interface unit provides to the modem in addition to the data signals which require transmission, a request to send signal and a transmit clock signal.

Figure 3:
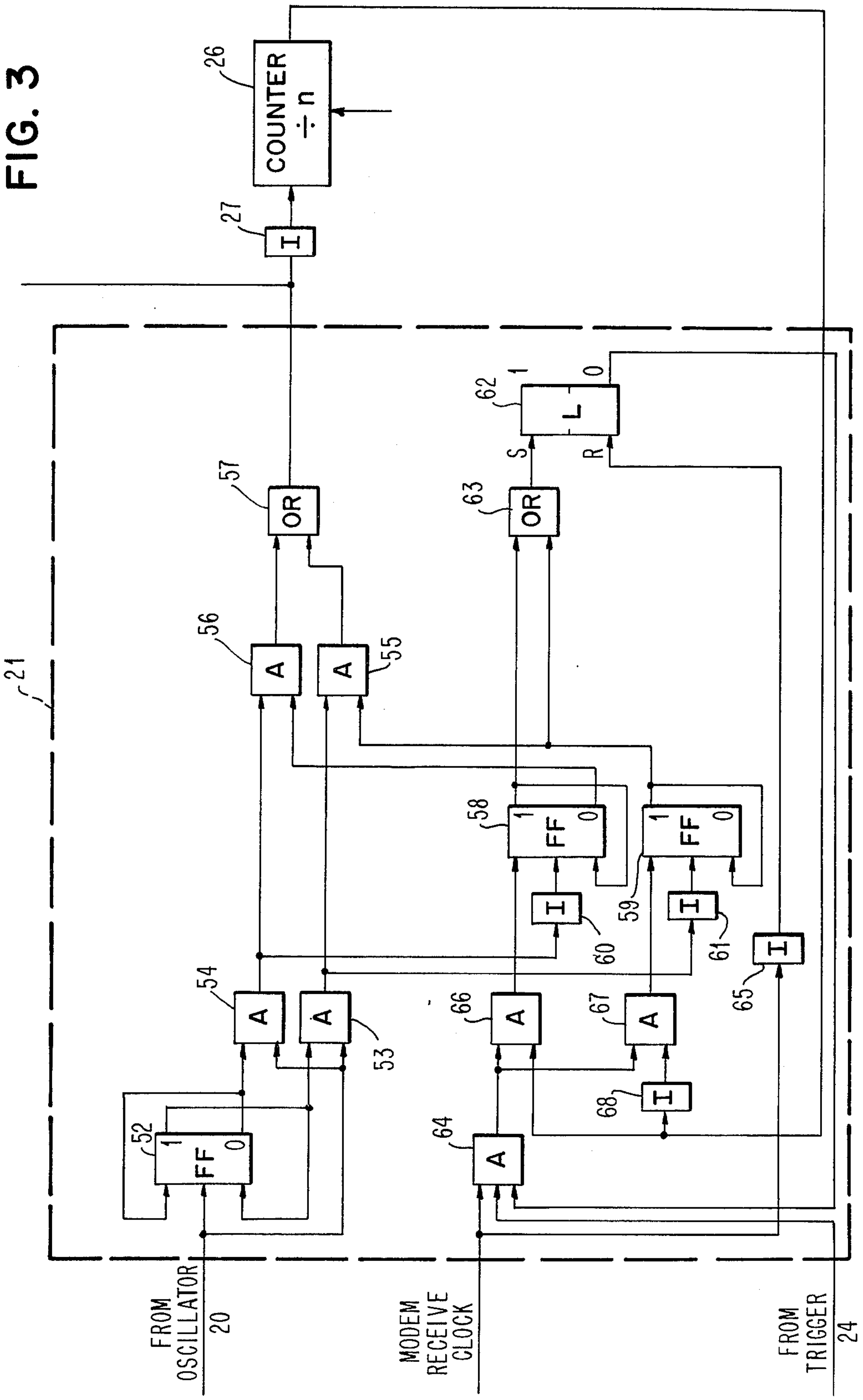
FIG. 3 is a block diagram of the clock correction circuit illustrated in FIG. 2.

As described above, the loop interface unit 15 has four modes of operation. In stand-by mode, no data signals or clock signals are received from the connected modem. No data signals are received from the stations 12 on the remote loop and the interface unit 15 supplies synchronizing signals to the stations to maintain synchronization on the loop. These signals are provided under control of a locally derived clock which includes a crystal controlled oscillator 20, a clock correction circuit 21 which in this mode of operation may be considered to be in an inactive state (the details of this circuit are illustrated in FIG. 3 and will be described later) and a counter circuit 22 which in conjunction with clock correction circuit 21 counts down or divides the frequency of oscillator 20 to the selected data clock frequency used on the half-duplex link. In this mode, the carrier detect line 23 from the modem is in an off condition or state which maintains a trigger 24 in the off or zero state. This is accomplished by connecting line 23 to the zero set input of trigger 24 via an inverter 25. Trigger 24 has its one output connected to an enable input for the clock correction circuit 21. Since the trigger 24 is reset or zero, circuit 21 is disabled or placed in the stand-by mode. A sync clock counter 26 connected to clock correction circuit 21 by an inverter 27 is also disabled by the zero output of trigger 24 in this mode. Inverter 27 is utilized to assure a phase difference between counters 22 and 26. This phase difference is utilized to prevent a loss of data and its operation will become apparent as the description continues.

The output of counter 22 which is at the data rate but under control of oscillator 20 is applied to the clocking or A.C. input of a one bit buffer trigger circuit 28 and by a inverter 29 to a counter 30 which is connected to divide the output of counter 22 by seven. The number seven is, of course, arbitrarily selected to coincide with and be compatible with the control signal on the loop. Inverter 2 is utilized to provide a half cycle of delay to prevent the occurrence of possible race conditions which might adversely affect operation. The output of counter 30 is gated to the loop via an AND gate 31 and an OR gate 40. Gate 31 is enabled by two triggers 33 and 34. Trigger 33 indicates the existence of the stand-by mode when set to the on or one state and when so set enables one input of gate 31. Trigger 34 indicates the existence of the transmit mode when set to the on or one state and when reset off or zero enables another input of gate 31. Stand-by trigger 33 is set to the on or one state whenever counter 30 provides an output to the clock or A.C. input of the trigger since the zero output of the trigger is connected directly to the one input. The output from counter 30 passed to the loop comprises six one bits followed by a zero repetitively in view of the division by seven in which the seventh counter stage emits a zero once every cycle of the counter which takes seven data clock times. This bit pattern is used by the loop stations to maintain synchronism, however, the stations will not attempt to transmit until the pattern changes as will be described below. Data bits returning from the loop are not passed onto the data set since an AND gate 35 is disabled by transmit trigger 34 being in the reset or zero state.

The stand-by mode of operation described above is followed by the receive mode in which data from the central station 10 for one or more stations 12 on the remote loop is received from the modem 17 and placed on the remote loop where the appropriate station 12 will receive the data. The receive mode begins when the carrier detect line 23 turns to on. When this occurs, trigger 24 turns on with the next transition of the modem receive clock. When trigger 24 turns on, sync clock counter 26 starts running since the inhibit line from the zero output of trigger 24 turns off. In addition, clock correction circuit 21 is enabled by the one output of trigger 24 which turns on. Trigger 24 turns on in synchronism with the modem receive clock and thus the sync clock counter 26 is in phase with the modem receive clock. The output of sync clock counter 26 is applied to one input of clock correction circuit 21 where it is compared with the modem receive clock for correction purposes and to a one bit buffer trigger 36 which receives the data signals from the modem 17. The data signals from the modem 17 are applied directly to the one input of buffer 36 and by an inverter 37 to the zero input. The output of counter 26 thus clocks the data from the modem 17 into buffer 36 one bit at a time in synchronism with the modem receive clock. The outputs of buffer 36 are clocked into buffer 28 by counter circuit 22. Counter circuit 22 and sync clock counter 26 are advanced on opposite phases of the output of clock correction circuit 21; thus, they operate at the same frequency but differ in phase. The phase difference assures that no data will be lost between the buffer 36 and 28. The amount of time an information bit is stored in buffer 35 before it is transferred to buffer 28 may vary from between one-half the period of the output of the clock correction circuit to a full data clock period minus one-half of the period of the output from clock correction circuit 21.

When a zero or space data signal appears at the output of buffer 28 (signifying the start of a data transmission from the modem 17) counter 30 and stand-by trigger 33 are reset via the output of an AND gate 38 thereby enabling the output of buffer 28 to be gated to the loop through an AND gate 39 and an OR gate 40. AND gate 38 is enabled by the carrier detect signal on line 23 and by the zero output of a trigger 41 which indicates the requirement to transmit data (request to send) when in the set condition. Trigger 41 is reset each time data transmission from stations 12 connected to the remote loop is completed. That is, each station on the remote loop has transmitted a data message or has had an opportunity to transmit a message and has declined that opportunity. How the reset is accomplished will be apparent as the description continues. AND gate 39 is enabled by the zero outputs of triggers 33 and 34 which are reset at this time. Trigger 33 is reset by the output of AND gate 38 described above and trigger 34 is in a reset state due to the down condition of the clear to send line 42 from modem 17 which is connected to the zero set input of trigger 34 by an inverter circuit 43. In addition to the above enabling inputs to AND gate 39, the carrier detect signal on line 23 is also applied as one of the three enabling conditions for this gate.

It is appropriate to point out at this time that counter 22 drives both buffer 28 and counter 30; thus there is no abrupt change in phase of the loop data transitions when the loop interface unit leaves the stand-by mode and enters the receive mode.

The receive mode continues until no zeros or spaces are received for seven contiguous bit times at which time receive mode terminates automatically. The use of seven contiguous ones is an arbitrarily selected signal for indicating the end of transmission from the central station 10. The interface unit enters the turn-around mode when the receive mode termination is detected. In this mode, the interface unit must intercept the seven contiguous ones since this signal, if detected by the stations on the remote loop, would cause them to start transmission. This is accomplished by substituting a zero bit for the seventh one bit received. This mode is necessary since a finite time is required for the modem to turn-around and transmissions from the stations 12 on the loop must not start until the modem has turned-around and is prepared to receive the data for transmission over the half-duplex link to the central station 10.

If seven contiguous ones are received, counter 30 goes to completion and generates a transition on its output. This transition is applied to stand-by trigger 33 causing it to turn on thus disabling AND gate 39 to intercept the data flow from buffer 28 to the loop. This condition occurs before the seventh one bit is transferred from buffer 28 to the loop since counter 30 is advanced one-half a bit time from buffer 28 due to the use of inverter 29. At the same time, AND gate 31 is enabled and the off to on transition of stand-by trigger 33 turns request to send trigger 41 on. When trigger 41 turns on, a request to send signal is sent to modem 17 via an AND circuit 44 and a request to send line 45. AND circuit 44 gates the request to send signal when the carrier detect signal disappears since its enabling input is connected to the output of inverter 25. In addition, the output of inverter 25 at this time resets trigger 24 and inhibits counter 26. As soon as trigger 24 is reset, clock correction circuit 21 becomes disabled. Request to send trigger 41 is set on as soon as the seventh one is received and AND gate 38 is disabled thus causing counter 30 to free run and apply a bit pattern of six consecutive ones and one zero to be transmitted to the loop via AND gate 31 and OR gate 40 as described above. The transmission of this pattern will continue until the clear to send signal is received from the modem 17 via the line 42 at which time turn-around mode terminates.

The transmit mode follows the turn-around mode and starts when the modem, in response to the request to send signal sent on line 45, returns the clear to send signal on line 42. This signal is applied to the set input of trigger 34 which is set to the on or one state on the subsequent zero to one transition of the data from the loop. This transition occurs at the end of the six ones and one zero pattern described above which is transmitted during the turn-around mode. When the transmit trigger 34 turns on, AND gate 35 is enabled and data from the loop is passed on via an inverter 46, AND gate 35 and a send data line 47 to the modem 17 for transmission to the central station 10 via the half-duplex link. Inverter 46 provides an NRZ like signal in which the on or up level indicates a zero bit. Loop clock signals are supplied to the modem over a transmit clock line 48. These signals are provided by a counter circuit 49 which is identical to counter 26 described above. Counter 49 is connected to a clock correction circuit 50 which is identical to clock correction circuit 21 described above. Clock correction circuit 50, however, receives a data derived clock signal from the loop terminator instead of the modem receive clock provided to circuit 21. When transmit mode trigger 34 is set on as described above, gates 31 and 39 are disabled which force the loop transmit data supplied to the loop driver to a steady one state. When this state exists for seven bit times, the stations may contend for the loop as described in the aforementioned U.S. Pat. No. 3,752,932. It should also be noted at this time that any necessary control signals, such as reset signals, for the stations on the remote loop are supplied by the central station 10 during the receive mode and the interface unit supplies only the pattern described above and the steady one state during transmit mode.

As data is received from the loop, it is applied via inverter 46, AND gate 35 and line 47 to the modem 17. At the same time, a steady one is transmitted to the loop driver. When the last terminal has transmitted its data, an uninterrupted string of one bits will be received at the loop terminator. Upon receipt of 15 consecutive one bits, the loop interface unit returns to the stand-by mode. This number was arbitrarily selected, however, it provides a reliable indicia that transmission from the loop has been completed. This condition is detected by a counter 51. Counter 51 is connected to the output of counter 49 and counts clock pulses. The counter has a reset input connected to the output of inverter 46 and is reset each time a zero data bit is received. If 15 one bits are received consecutively, counter 51 provides an output which resets the request to send trigger 41. When this trigger is reset, the request to send signal on line 45 drops. The modem 17 upon detecting this condition, drops the clear to send signal on line 42. This automatically resets trigger 34 to off or zero which automatically restores the loop interface unit to the standby mode which was the initial condition described.

The details of clock correction circuit 21 are shown in FIG. 3. The output from crystal controlled oscillator 20 is applied to the clock or A.C. input of a trigger circuit 52 which has its outputs cross-connected to the inputs to provide a bistable multivibrator which requires two triggering pulses from oscillator 20 to complete a cycle of operation. Thus, the frequency of the signals appearing at each of the two outputs is one-half the frequency of oscillator 20 and the outputs are of opposite phase. The one and zero outputs of trigger 52 are connected to AND gates 53 and 54, respectively. The output from oscillator 20 is also connected to AND gates 53 and 54, thus these gates pass alternate pulses from oscillator 20. Gate 53 is connected to another AND gate 55 and gate 54 to an AND gate 56. The outputs of AND gates 55 and 56 are connected to an OR gate 57 which provides the output illustrated in FIG. 2. AND gate 56 is enabled by the off or zero output of a retard trigger circuit 58 and gate 55 is enabled by the on or one output of an advance trigger circuit 59. Trigger circuits 58 and 59 have their clock or A.C. inputs connected to gates 54 and 53 by inverter circuits 60 and 61, respectively. The on or one outputs of triggers 58 and 59 are connected to the off or zero inputs so that these triggers are reset to zero on a subsequent clock or trigger pulse if they were set to on with a prior clock or trigger pulse. In addition, the on or one outputs are connected to the set input of a latch circuit 62 via an OR circuit 63.

The modem receive clock signal is applied to an AND circuit 64 and by an inverter circuit 65 to the reset input of latch 62. The off or zero output of latch 62 comprises one of the two enabling inputs of AND gate 64. The other enabling input is the on or one output of trigger 24 illustrated in FIG. 2 and described above. The modem receive clock pulses appearing at the output of AND gate 64 when enabled are applied to two AND gates 66 and 67 whose outputs are connected to the on or one inputs of trigger circuits 60 and 61, respectively. The output of counter 26 is applied directly to AND gate 66 and by an inverter 68 to AND gate 67.

When circuit 21 is disabled, pulses from the off or zero output of trigger 52 are applied via AND gates 54 and 56 and OR gate 57 to counters 22 and 26, however, counter 26 is inhibited at this time and counter 22 under control of oscillator 20 clocks the signals described above on to the loop with no correction applied since triggers 58 and 59 remain in the off or zero state. When the receive mode starts, AND gate 64 is enabled by trigger 24 and latch 62 which is reset if not in this state by the first positive to negative transition of the modem receive clock via inverter 65. At the same time, the inhibit is removed from counter 26. Thereafter, modem receive clock pulses are compared in AND gates 66 and 67 with two phases of the output of counter 26 which has the same nominal frequency as the modem receive clock as described above. If the modem receive clock is late with respect to the output of counter 26, it is detected at AND gate 66 which sets retard trigger 58 to on or one. This disables gate 56 removing one pulse from counters 22 and 26. When trigger 58 is set to on, latch 62 is also set which removes the enable from AND gate 64 for one clock pulse thus counter 26 can be adjusted up or down by one pulse from trigger 52 per clock period. If the modem receive clock is early with respect to the output of counter 26, it is detected at AND gate 67 which sets advance trigger 59 to on or one. This condition enables AND gate 55 which sends an extra pulse to counters 22 and 26 causing them to advance at a faster rate. Again, latch 62 is set as described above so that the advance is limited to one pulse per clock period.

From the above description, it is seen that counter 22 free runs under control of oscillator 20 until the receive mode starts. At this time, counter 26 is started and corrections are made to both counters 22 and 26 gradually until the phases reach a predetermined relationship with the phase of the modem receive clock. The changes are gradual since the frequency of oscillator 20 may be made many times greater than the modem receive clock frequency and the retard and advance increments are a function of the frequency of oscillator 20. Once the clocks are in phase, the correction circuitry will maintain the phase relation and adjust for any frequency difference due to tolerances from the nominal frequency of the two clocks.

The circuit described above may be utilized for clock correction circuit 50 with virtually no modification. All that need be done is the elimination of the enable input from trigger 24 since in this use clock correction is active at all times.

While the invention has been particularly shown and described with reference to preferred embodiments thereof, it will be understood by those skilled in the art that various changes in form and details may be made therein without departing from the spirit and scope of the invention.

What is claimed is:

1. An interface unit located at a remote synchronous serial data communications loop for connecting a central station to the remote synchronous serial data communications loop via a half-duplex data communications link and in which said remote loop may assume a transmit mode in which data from the devices on the loop are sent via the half-duplex link to the central station and a receive mode in which data signals from the central station are received via the half-duplex link and transferred to the devices on the loop comprising:

a first circuit means for generating first clocking signals at a predetermined frequency;

a second circuit means for generating second clocking signals at said predetermined frequency in synchronism with the signals received from said half-duplex communications link;

clock control means responsive to the signals received from said half-duplex communications link and said second clocking signals for simultaneously incrementally adjusting the phase of the first and second clock signal generating means to cause said first and second clocking signals to gradually assume a predetermined phase relationship with respect to the phase of the signals received from said half-duplex communications link;

a first buffer means for receiving data signals from said half-duplex communications link under control of second clocking signals;

a second buffer means for receiving data signals from said first buffer means under control of said first clocking signals;

signal generating means for generating control signals under control of said first clocking signals; and control circuit means responsive to signals received from said half-duplex communications link for transmitting the contents of said second buffer means to the loop when data signals are being received from said half-duplex communications link and for transmitting said control signals from said signal generating means when data signals are not being received whereby said devices on said loop are maintained in synchronism at all times regardless of the direction of transmission on said half-duplex link.

2. An interface unit as set forth in claim 1 in which said first and second clocking signals have a predetermined phase difference.

3. An interface unit as set forth in claim 2 in which said first and second buffer means receive and store a single data signal.

4. An interface unit as set forth in claim 2 in which said second circuit means for generating said second clocking signals is inhibited while no signals are received from said half-duplex communications link and is started when signals are received from the half-duplex communications link.

5. An interface unit as set forth in claim 4 in which said first and second circuit means for generating said first and second clocking signals each include a common source of pulsating electric signals and gate means under control of said clock control means for controlling the number of pulses applied to the noncommon elements of the said first and second circuit means.

6. An interface unit as set forth in claim 5 in which said clock control means includes means for comparing the phase of signals received from said half-duplex communications link with the phase of said second clocking signals to provide control signals for controlling the common gate means to advance or retard said first and second circuit means by a predetermined amount to cause the phase of the first and second clocking signals to gradually assume a predetermined relationship to the signals received from the half-duplex communications link.

7. An interface unit as set forth in claim 6 in which said common source of pulsating signals has a frequency substantially higher than the frequency of the signals received from said half-duplex communications link and said clock control means includes circuit means responsive to the control signals generated by said comparison means to limit the control exercised over the common gate means whereby correction of the phase of said first and second clocking signals is gradually achieved.

* * * * *